May 5, 1959  J. M. WALLACE, JR  2,884,941
FLUID PRESSURE CONTROL AND RELIEF VALVE
Filed Sept. 15, 1953
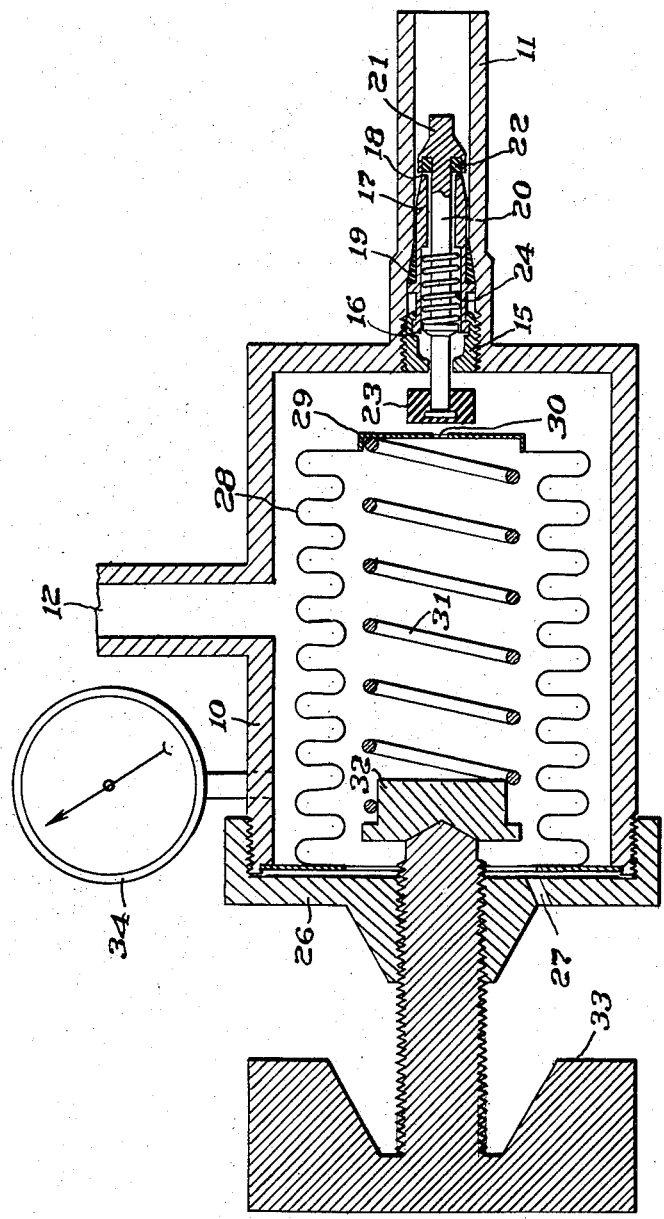
INVENTOR.
JAMES M. WALLACE, JR.
BY R.W Furlong
ATTORNEY

United States Patent Office 2,884,941
Patented May 5, 1959

2,884,941

FLUID PRESSURE CONTROL AND RELIEF VALVE

James M. Wallace, Jr., Attleboro, Mass., assignor, by mesne assignments, to Kidde Manufacturing Co., Inc., Bloomfield, N.J., a corporation of New Jersey Application September 15, 1953, Serial No. 380,180

1 Claim. (Cl. 137—116.3)

This invention relates to a fluid pressure regulating device and pertains more specifically to a combined pressure reducing and pressure regulating valve.

One object of the present invention is to provide a device of simple and inexpensive construction capable of maintaining a supply of fluid at a predetermined adjustable pressure.

Another object is to provide a pressure regulating device including provision for progressively varying the pressure to any desired level from that of the pressure supply down to atmospheric pressure without interruption of the pressure by means of a single control.

A further object is to provide a lightweight portable pressure regulating and relief valve capable of use in the field including means for gradual manual adjustment of the pressure delivered either upwardly or downwardly within the limits of the pressure supply.

Other and further objects will be apparent from the drawing and from the description which follows.

Although numerous pressure regulating devices have hitherto been proposed, many of these have been complicated in design and heavy in weight, so that they are not suited for field work where they are frequently subject to rough treatment. Other devices have been incapable of providing for progressive changes in the pressure supply while the device is in use without interruption of the pressure supply or have required two or more separate adjustments to vary the pressure.

The device of the present invention overcomes these deficiencies, being of lightweight and rugged construction admirably adapted for use as a portable instrument in the field. The device is of particular value for use in conjunction with pneumatic tourniquets, since it enables the pressure within the tourniquet to be raised or lowered or maintained at any desired level by a simple manual setting of one control, thus making it possible to permit limited circulation of blood past the tourniquet at any desired intervals without permitting excessive bleeding.

One embodiment of the device is shown in the appended drawing wherein the single figure is a view of the valve in vertical section. The device includes a generally cylindrical casing 10, an inlet connection 11 which may be connected to any suitable source of fluid pressure (not shown) such as a cartridge of compressed carbon dioxide or the like, and an outlet connection 12 from which the gas or other fluid is supplied at the desired pressure. Within the inlet 11 is mounted a valve for controlling the flow of gas through the inlet into chamber 10, the valve including a supporting member 15 threaded into the inlet connection 11 and having an internal annular groove 16 within which is engaged the flanged lower end of a barrel 17 providing at its upper end an annular valve seat 18. A gasket 19 of suitable rubbery material is provided to seal barrel 17 to the inner wall of inlet connection 11. Mounted concentrically within the barrel 17 is a rigid valve stem 20 carrying at one end valve member 21 which seats against valve seat 18 at the inlet side thereof. Valve member 21 includes an annular sealing ring 22 of rubbery material to ensure tight sealing of the valve.

At the other end of the valve stem 20 is provided a second valve member 23, which may be formed of rubbery material and which projects within casing 10. A compression spring 24, seated between an annular shoulder on the valve stem 20 and an internal shoulder of the barrel 17, serves to ensure positive closing of the valve member 21.

A cap 26 is threaded on the end of the casing 10 and is provided with a vent opening 27. Sealed between the casing 10 and the cap 26 is the margin of a flexible expansible generally cylindrical bellows or diaphragm means 28, which may suitably be made of very thin gauge copper or the like, the inner end of bellows 28 being closed by a relatively rigid wall member 29 provided with an aperture 30 through which the interior of the bellows communicates with the interior of the casing 10. Inasmuch as the bellows 28 is expansible, the wall member 29 is movable toward and away from the valve member 23, and is aligned therewith so that the aperture 30 is sealed by the valve member when the wall member and the valve member 23 are in contact. Since the upper end of the bellows 28 is completely open, the interior of the bellows also communicates with the atmosphere through the vent opening 27. Mounted within the bellows 28 and serving to maintain it in an expanded condition is a compression spring 31 which seats between the wall member 29 and an adjustable seat 32, the position of which may be adjusted by turning adjusting screw 33 which is threaded through the cap 26. A pressure gauge 34 is provided to indicate the pressure within the casing 10 and outlet connection 12.

In operation, the inlet 11 is connected to a suitable source of gas or other fluid under any desired pressure, that is, at least as great as the pressure desired in outlet 12. By reason of the valve 21 normally being maintained in a closed position by means of the compression spring 24, no gas is permitted to enter the casing 10 while the device is in the position shown in the drawing, and the pressure within the chamber 10 and the outlet 12 remains at atmospheric pressure (zero gauge pressure) because of free communication with the atmosphere through vents 27 and 30. When the adjusting screw 33 is turned so as to increase the compression of the spring 31, thus expanding bellows 28 and forcing the movable wall 29 against the valve member 23, the vent 30 is sealed, thus preventing escape of any gas from the casing 10 and the outlet 12 to the atmosphere. If the compression of the spring 31 is further increased by continued rotation of the adjusting screw 33, the assembly consisting of the valve member 23, the valve stem 20, and the valve 21 is urged upwardly as shown in the drawing against the compression of the spring 24 and the pressure of the gas in the supply pipe, thus permitting gas to flow from the inlet 11 into the casing 10 and through the outlet 12. As the gas pressure builds up in the outlet 12 and in the casing 10, the pressure differential between this space and the interior of the bellows 28 (which is vented to the atmosphere through the vent opening 27) causes the movable wall 29 to be urged downwardly against the compression of spring 31, thus permitting the valve 21 to seat against the valve seat 18 and prevent the inflow of further gas. If the pressure in the outlet 12 should drop for any reason, the compression spring 31, when the pressure drop between the casing 10 and the interior of the bellows 28 is sufficiently lowered, will again open the valve 21 and permit the flow of further gas from the supply.

If it is desired to reduce the pressure in the casing 10 and the outlet 12, for example when a tourniquet cuff is connected to the outlet 12, it is merely necessary to rotate the adjusting screw 33 to reduce the compression of spring 31, thus permitting the pressure differential between the casing 10 and the interior of the bellows 28 to force the movable wall 29 away from the valve member 23. The gas within the casing 10 and the outlet connection 12 is thus free to escape to the atmosphere through the vents 30 and 27 until the desired new pressure level has been attained, whereupon the spring 31 will again automatically force the movable wall 29 against the valve member 23, thus preventing the loss of further gas pressure. When the compression of the spring 31 is sufficiently reduced, the pressure in the casing 10 will be lowered to atmospheric pressure (zero gauge pressure).

The device of the present invention makes it possible to adjust the pressure within the outlet connection 12 either gradually upwardly or gradually downwardly without sharp fluctuations and while maintaining very close control over the pressure as shown on the gauge 34.

It will be noted that the pressure in the casing 10 and the outlet 12 is independent of fluctuations in the gas supply pressure, although of course the supply pressure limits the maximum pressure obtainable in the casing and outlet. At any fixed setting of the screw 33 the pressure in the casing and the outlet will exceed atmospheric by an amount equal to the force exerted on the wall member 29 by the spring 31 when the wall member is just touching the valve member 23 so as to seal the aperture 30, divided by the area of the wall member; the range of variation in the desired pressure will depend at least in part upon the resistance of the spring 24 which opposes opening of the valve 21. By appropriate choice of springs and dimensions of the various parts, this range may be reduced to a very low value. Indeed, the spring 24 may be omitted entirely, so that the valve 21 is urged to a closed position solely by the pressure drop between the gas supply and the casing.

Although I have herein described a specific embodiment of my invention, I do not intend to limit myself solely thereto, but to include all of the obvious variations and modifications within the spirit and scope of the appended claim.

I claim:

A fluid pressure control device comprising a casing providing a chamber having an inlet at its upper end, an outlet, and a vent opening at its lower end; a valve seat in said inlet facing upstream, a valve member for said seat, a stem having its upper end secured to said valve member and extending into said chamber; a second valve member having a rubbery sealing surface and being secured to the lower end of said stem so that said valve members move as a unit; a spring for biasing said first mentioned valve member on its seat; diaphragm means secured within said chamber to provide a seal between said vent opening and said inlet and outlet including a movable wall facing said second valve member and having an aperture adapted to be sealed by said second valve member; a second spring in said chamber between said movable wall and the end of said casing formed with said vent opening having its upper end directly engaging the underside of said movable wall and urging said movable wall into direct engagement with said second valve member; a member having a shank screw-threaded through said lower wall casing end and extending into the lower end of said chamber and having a manually engageable and operatable portion disposed exteriorly of said chamber; and a seat member for the lower end of said second spring mounted on the upper end of said shank, whereby said second spring can be compressed to urge said movable wall upwardly against said second valve member and effect unseating of said first valve member and said movable wall can move independently of said second valve member to effect unsealing of said aperture and establish communication between the portion of said chamber in which said inlet and outlet are provided and said vent opening.

References Cited in the file of this patent

UNITED STATES PATENTS

| | | |
|---|---|---|
| 330,549 | Beard | Nov. 17, 1885 |
| 1,595,809 | Nichols | Aug. 10, 1926 |
| 1,637,085 | Nichols | July 26, 1927 |
| 2,212,626 | Thomas | Aug. 27, 1940 |
| 2,252,152 | Work | Aug. 12, 1941 |
| 2,357,318 | Donaldson | Sept. 5, 1944 |
| 2,684,838 | Rush | July 17, 1954 |

FOREIGN PATENTS

| | | |
|---|---|---|
| 47,104 | Netherlands | Nov. 15, 1939 |